(12) United States Patent
Kennedy

(10) Patent No.: US 8,461,700 B2
(45) Date of Patent: Jun. 11, 2013

(54) TRANSIENT ABSORBER FOR POWER GENERATION SYSTEM

(75) Inventor: Eugene J. Kennedy, Philadelphia, PA (US)

(73) Assignee: Kinetic Energy Corporation, Washington, DC (US)

( * ) Notice: Subject to any disclaimer, the term of this patent is extended or adjusted under 35 U.S.C. 154(b) by 196 days.

(21) Appl. No.: 12/695,132

(22) Filed: Jan. 27, 2010
(Under 37 CFR 1.47)

(65) Prior Publication Data

US 2011/0101701 A1    May 5, 2011

Related U.S. Application Data

(60) Provisional application No. 61/147,747, filed on Jan. 27, 2009, provisional application No. 61/147,748, filed on Jan. 27, 2009, provisional application No. 61/147,749, filed on Jan. 27, 2009, provisional application No. 61/147,750, filed on Jan. 27, 2009, provisional application No. 61/147,752, filed on Jan. 27, 2009, provisional application No. 61/147,754, filed on Jan. 27, 2009.

(51) Int. Cl.
*F02B 63/04* (2006.01)
*F03G 7/08* (2006.01)
*H02K 7/18* (2006.01)

(52) U.S. Cl.
USPC ............................................ 290/1 R; 404/71

(58) Field of Classification Search
USPC .................................... 290/1 R, 1 C; 404/71
See application file for complete search history.

(56) References Cited

U.S. PATENT DOCUMENTS

| 1,312,131 | A | 8/1919 | Morton |
| 1,771,200 | A | 7/1930 | Akers |
| 1,916,873 | A | 7/1933 | Wiggins |
| 3,748,443 | A | 7/1973 | Kroll et al. |
| 3,859,589 | A | 1/1975 | Rush |
| 3,885,163 | A | 5/1975 | Toberman |
| 3,918,844 | A | 11/1975 | Bailey |
| 3,944,855 | A | 3/1976 | Le Van |
| 4,004,422 | A | 1/1977 | Le Van |
| 4,081,224 | A | 3/1978 | Krupp |

(Continued)

FOREIGN PATENT DOCUMENTS

CH    1986/007504 A1    12/1986

OTHER PUBLICATIONS

Blaine R. Copenheaver, International Search Report, PCT/US2010/022296 Jul. 29, 2010, p. 2, Alexandria, VA, US.

(Continued)

*Primary Examiner* — Hae Moon Hyeon
(74) *Attorney, Agent, or Firm* — Dresch IP Law, PLLC; John J. Dresch

(57) ABSTRACT

A vehicle energy harvester including a subunit having an upper surface forming a roadway surface; a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface; a generator that generates power in response to movement of the vehicle activated treadle; and a transient absorption device coupled between the vehicle activated treadle and the generator.

17 Claims, 3 Drawing Sheets

U.S. PATENT DOCUMENTS

| | | | |
|---|---|---|---|
| 4,115,034 A | 9/1978 | Smith | |
| 4,130,064 A | 12/1978 | Bridwell | |
| 4,211,078 A | 7/1980 | Bass | |
| 4,212,598 A | 7/1980 | Roche et al. | |
| 4,228,360 A | 10/1980 | Navarro | |
| 4,238,687 A * | 12/1980 | Martinez | 290/1 R |
| 4,239,974 A | 12/1980 | Swander et al. | |
| 4,239,975 A * | 12/1980 | Chiappetti | 290/1 R |
| 4,247,785 A | 1/1981 | Apgar | |
| 4,250,395 A * | 2/1981 | Lundgren | 290/1 R |
| 4,322,673 A | 3/1982 | Dukess | |
| 4,339,920 A | 7/1982 | Le Van | |
| 4,409,489 A | 10/1983 | Hayes | |
| 4,418,542 A | 12/1983 | Ferrell | |
| 4,434,374 A | 2/1984 | Lundgren | |
| 4,437,015 A | 3/1984 | Rosenblum | |
| 4,614,875 A | 9/1986 | McGee | |
| 4,700,540 A | 10/1987 | Byrum | |
| 4,739,179 A | 4/1988 | Stites | |
| 4,912,995 A | 4/1990 | Otters | |
| 4,915,196 A | 4/1990 | Krisko | |
| 4,944,474 A | 7/1990 | Jones | |
| 4,980,572 A * | 12/1990 | Sen | 290/1 R |
| 5,119,136 A | 6/1992 | Morikawa | |
| 5,157,922 A | 10/1992 | Baruch | |
| 5,250,769 A | 10/1993 | Moore | |
| 5,347,186 A | 9/1994 | Konotchick | |
| 5,355,674 A | 10/1994 | Rosenberg | |
| 5,449,909 A | 9/1995 | Kaiser et al. | |
| 5,634,774 A | 6/1997 | Angel et al. | |
| 5,648,645 A | 7/1997 | Arpagaus et al. | |
| 5,678,933 A | 10/1997 | Ouchi et al. | |
| 5,977,742 A | 11/1999 | Henmi | |
| 5,984,432 A | 11/1999 | Otomo et al. | |
| 6,023,134 A | 2/2000 | Carl et al. | |
| 6,091,159 A | 7/2000 | Galich | |
| 6,116,704 A | 9/2000 | Nakakita et al. | |
| 6,172,426 B1 | 1/2001 | Galich | |
| 6,204,568 B1 * | 3/2001 | Runner | 290/1 R |
| 6,353,270 B1 * | 3/2002 | Sen | 290/1 R |
| 6,362,534 B1 | 3/2002 | Kaufman | |
| 6,376,925 B1 | 4/2002 | Galich | |
| 6,467,266 B1 | 10/2002 | Kanazawa et al. | |
| 6,494,144 B1 | 12/2002 | Perez Sanchez | |
| 6,662,099 B2 | 12/2003 | Knaian et al. | |
| 6,718,760 B1 | 4/2004 | Padera | |
| 6,734,575 B2 | 5/2004 | Ricketts | |
| 6,756,694 B2 | 6/2004 | Ricketts | |
| 6,767,161 B1 | 7/2004 | Calvo et al. | |
| 6,812,588 B1 | 11/2004 | Zadig | |
| 6,858,952 B2 | 2/2005 | Gott et al. | |
| 6,894,233 B2 | 5/2005 | Dingwall et al. | |
| 6,936,932 B2 | 8/2005 | Kenney | |
| 6,969,213 B2 | 11/2005 | Rastegar et al. | |
| 7,043,904 B2 | 5/2006 | Newman | |
| 7,067,932 B1 | 6/2006 | Ghassemi | |
| 7,102,244 B2 | 9/2006 | Hunter, Jr. | |
| 7,145,257 B2 | 12/2006 | Ricketts | |
| 7,148,581 B2 | 12/2006 | Hershey et al. | |
| 7,239,031 B2 | 7/2007 | Ricketts | |
| 7,315,088 B2 | 1/2008 | Erriu | |
| 7,371,030 B2 | 5/2008 | Hickman | |
| 7,541,684 B1 * | 6/2009 | Valentino | 290/1 R |
| 7,629,698 B2 * | 12/2009 | Horianopoulos et al. | 290/1 R |
| 7,717,043 B2 * | 5/2010 | Rastegar et al. | 104/26.2 |
| 2003/0132636 A1 | 7/2003 | Ricketts | |
| 2003/0151381 A1 | 8/2003 | Kadota et al. | |
| 2004/0066041 A1 | 4/2004 | Hunter, Jr. | |
| 2005/0116545 A1 | 6/2005 | Hamel et al. | |
| 2005/0143876 A1 | 6/2005 | Tanase | |
| 2005/0200132 A1 | 9/2005 | Kenney | |
| 2006/0152008 A1 | 7/2006 | Ghassemi | |
| 2006/0237968 A1 | 10/2006 | Chandrasekaran | |
| 2007/0018803 A1 | 1/2007 | Lang | |
| 2007/0020047 A1 * | 1/2007 | Adair | 404/71 |
| 2007/0085342 A1 | 4/2007 | Horianopoulos et al. | |
| 2007/0158945 A1 | 7/2007 | Annen et al. | |
| 2007/0264081 A1 * | 11/2007 | Chiu | 404/71 |
| 2008/0224477 A1 | 9/2008 | Kenney | |
| 2009/0315334 A1 * | 12/2009 | Chen | 290/1 A |

OTHER PUBLICATIONS

Lee W. Young, International Search Report, PCT/US2010/020676 Jun. 15, 2010, p. 2, Alexandria, VA, US.
Lee W. Young, International Search Report, PCT/US2009/066024 Apr. 2, 2010, p. 2, Alexandria, VA, US.
Blaine R. Copenheaver, International Search Report, PCT/US2009/066025 Mar. 10, 2010, p. 2, Alexandria, VA, US.
Lee W. Young, International Search Report, PCT/US2010/022287 Jun. 1, 2010, p. 2, Alexandria, VA, US.
Blaine R. Copenheaver, International Search Report, PCT/US2010/022288 Jul. 12, 2010, p. 2, Alexandria, VA, US.
Lee W. Young, International Search Report, PCT/US2010/022289 Jun. 1, 2010, p. 2, Alexandria, VA, US.
Lee W. Young, International Search Report, PCT/US2010/022291 Jun. 15, 2010, p. 2, Alexandria, VA, US.
Blaine R. Copenheaver, International Search Report, PCT/US2010/022294 Jun. 28, 2010, p. 2, Alexandria, VA, US.

* cited by examiner

TRANSIENT ABSORBER FOR POWER GENERATION SYSTEM

CROSS-REFERENCE TO RELATED APPLICATIONS

The present invention claims the benefit of U.S. Provisional Patent Application No. 61/147,747, filed Jan. 27, 2009, and entitled "TRANSIENT ABSORBER FOR POWER GENERATION SYSTEM", U.S. Provisional Patent Application No. 61/147,748, filed Jan. 27, 2009, and entitled "WEATHER RESPONSIVE TREADLE LOCKING MEANS FOR POWER GENERATION SYSTEM", U.S. Provisional Patent Application No. 61/147,749, filed Jan. 27, 2009, and entitled "LOW PROFILE, SURFACE-MOUNTED POWER GENERATION SYSTEM", U.S. Provisional Patent Application No. 61/147,750, filed Jan. 27, 2009, and entitled "VEHICLE SPEED DETECTION MEANS FOR POWER GENERATION SYSTEM", U.S. Provisional Patent Application No. 61/147,752, filed Jan. 27, 2009, and entitled "RECIPROCAL SPRING ARRANGEMENT FOR POWER GENERATION SYSTEM", and U.S. Provisional Patent Application No. 61/147,754, filed Jan. 27, 2009, and entitled "LOSSLESS SHORT-DURATION ELECTRICAL STORAGE MEANS FOR POWER GENERATION SYSTEM", the entire contents of which are incorporated herein by reference in their entirety.

FIELD OF THE INVENTION

The present invention is directed toward devices and methods of harvesting vehicle energy, and more specifically, toward a Transient Absorber for a Power Generation System for harvesting vehicle energy.

BACKGROUND OF THE INVENTION

Very few devices that capture energy from passing vehicles have been implemented, despite numerous designs put forth by various parties over the years. Issues of efficiency, reliability, and manufacturability, among others, have limited the practicality of vehicle energy harvesting devices. Added to the challenge is the variability of vehicle sizes, speeds, axle configurations, and lane positions, all of which can greatly influence the operation of a device trying to capture the motion energy of vehicles and convert it into a useful form of energy.

Therefore, a need exists for an energy capture device and method having improved efficiency, reliability, and manufacturability, as well as practicality. A need also exists for an energy capture device and method that takes into account the variability of vehicle sizes, speeds, axle configurations, and lane positions in converting the captured motion energy of vehicles into a useful form of energy.

SUMMARY OF THE INVENTION

These problems and others are addressed by the present invention, which provides a novel vehicle energy harvester that overcomes many of the issues with the conventional devices and is therefore better suited for real-world implementation than the conventional devices.

The exemplary embodiments of the invention make productive use of the energy that is normally wasted (in the form of heat) in reducing the speed of motor vehicles on exit ramps, toll plazas etc., etc. The vehicle energy harvester can absorb mechanical energy from passing (or breaking) vehicles and convert the mechanical energy to electrical energy using, for example, shaft driven generators.

The disclosed embodiments provide a vehicle energy harvester and power generation system that is simple to install, provides a short payback period, and has a scalable configuration. More particularly, the disclosed embodiments can provide a simple and reliable mechanical configuration that can withstand severe environments. The low cost configuration of the system may provide for faster payback of the expense of the system, and therefore, make the system more practical and desirable for practical applications.

Additionally, the ease with which the system can be installed also may make the system more practical and desirable for practical applications. The disclosed embodiments require little or no excavation and can be installed in a few hours, instead of over several days as with conventional devices.

The disclosed embodiment also can provide a scalable configuration that may be particularly advantageous for use at locations, such as exits ramps, toll plazas, hills, among other locations.

An embodiment also can include monitoring the status or operation of the unit, either periodically or 24 hours per day, seven days per week, using for example, a wireless link or other wired or wireless communication device.

The exemplary embodiments improve the durability of the system under practical use scenarios. The embodiments of the invention are capable of withstanding the stresses placed upon the system during normal use. The embodiments of the invention recognize that numerous factors may reduce the durability of the system under normal use including, for example, motor vehicles impacting the treadles at highway/freeway speeds of 60 to 70 miles per hour or more, and ice build-up restricting free movement of the treadle assembly, among other things.

The embodiments of the invention address and solve these problems and improve the durability of a treadle based energy conversion systems according to the embodiments of the invention.

In order to reduce the wear and tear on the treadle assembly, embodiments of the present invention include a transient absorption means in the form of a torsion spring. In conventional systems, the treadle drive mechanism is attached directly to an electrical generation means. As a result, high speed vehicle impacts with the treadle assembly will cause undue stress on the mechanical components due to the inertia of the electrical generation means connected to it. The exemplary embodiments of the present invention, for example as shown in FIG. 1, reduce the mechanical stress (impulse) on the mechanical components substantially by storing the treadle drive output in a torsion spring which will release its stored energy to the alternator after the vehicle passes over the treadle.

An exemplary embodiment of the invention is directed to, for example, a vehicle energy harvester comprising a subunit having an upper surface forming a roadway surface, a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface, a generator that generates power in response to movement of the vehicle activated treadle, and a transient absorption device coupled between the vehicle activated treadle and the generator. The transient absorption device can be, for example, a torsion spring, a flexible link, etc.

The vehicle energy harvester can include a treadle gear coupled to the vehicle activated treadle, and a drive gear mounted on a rotatable shaft, the drive gear engaging and being driven by movement of the treadle gear, wherein the rotatable shaft is coupled to the generator. The transient absorption device can be a torsion spring coupled between the rotatable shaft and the generator. A flywheel can be coupled between the transient absorption device, for example the torsion spring, and the generator.

The vehicle energy harvester can include a drive gear mounted on a rotatable shaft, wherein the rotatable shaft is coupled to the generator, and wherein the drive gear is driven by movement of the vehicle activated treadle, and wherein the transient absorption device couples the vehicle activated treadle to the drive gear. The transient absorption device can be a flexible link coupled between the vehicle activated treadle and the drive gear.

Another exemplary embodiment of the invention is directed to, for example, a vehicle energy harvester comprising a plurality of subunits each having an upper surface forming a roadway surface, a vehicle activated treadle on at least one of the plurality of subunits, the vehicle activated treadle moveable between a first position in which an upper surface of the treadle is at an angle with respect to the upper surface of the roadway surface and a second position in which the upper surface of the treadle is flush with the upper surface of the roadway surface, a generator that generates power in response to movement of the vehicle activated treadle, and a transient absorption device coupled between the vehicle activated treadle and the generator.

Another exemplary embodiment of the invention is directed to, for example, a vehicle energy harvester comprising a subunit having an upper surface forming a roadway surface, a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface, a generator that generates power in response to movement of the vehicle activated treadle, and transient absorption means for absorbing an impact of a travelling vehicle on the vehicle activated treadle, the transient absorption means coupled between the vehicle activated treadle and the generator.

BRIEF DESCRIPTION OF THE DRAWINGS

These and other aspects and features of embodiments of the present invention will be better understood after a reading of the following detailed description, together with the attached drawings, wherein.

DETAILED DESCRIPTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
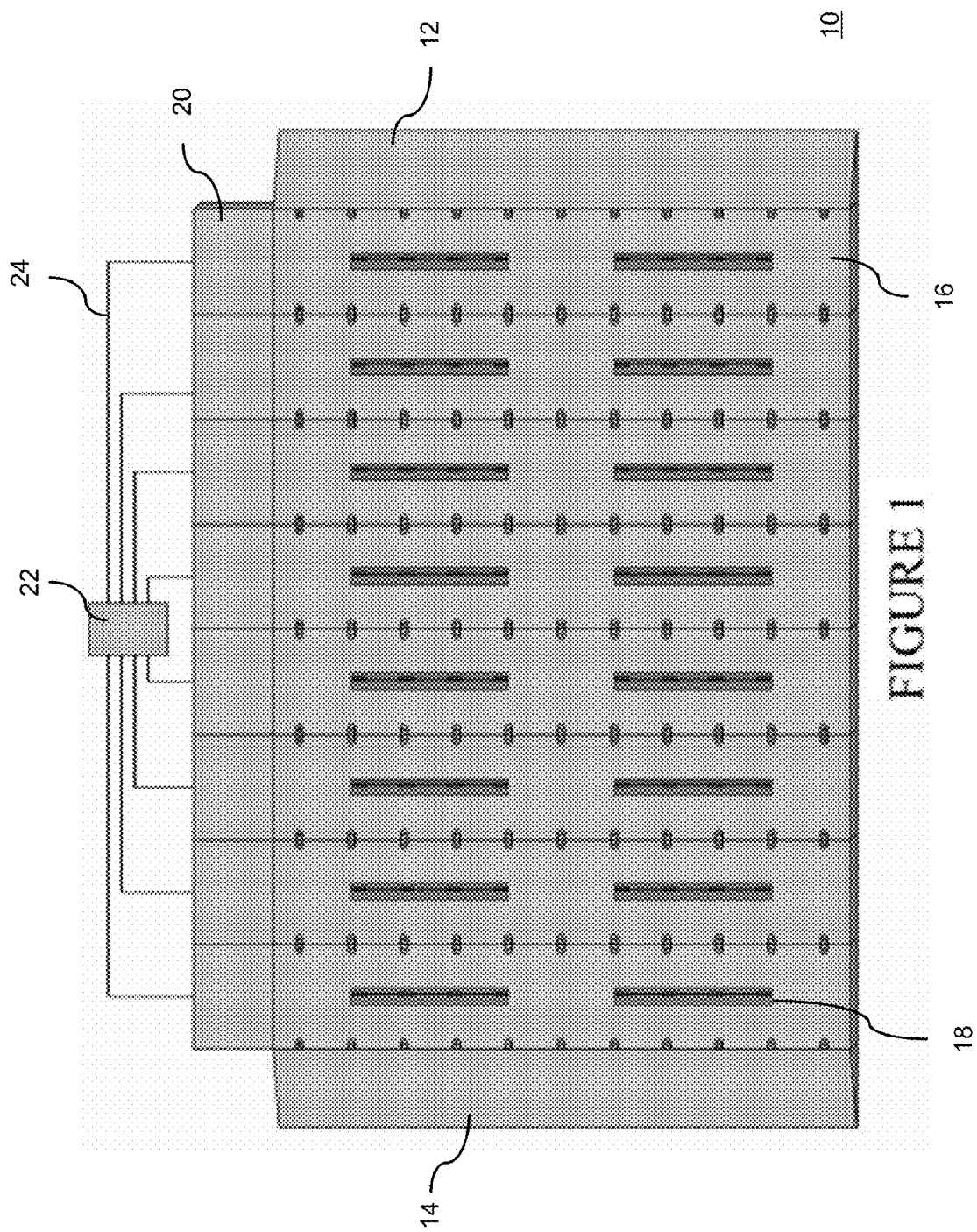
FIG. 1 is a schematic top view of a power absorber unit of a vehicle energy harvester.
Figure 2:
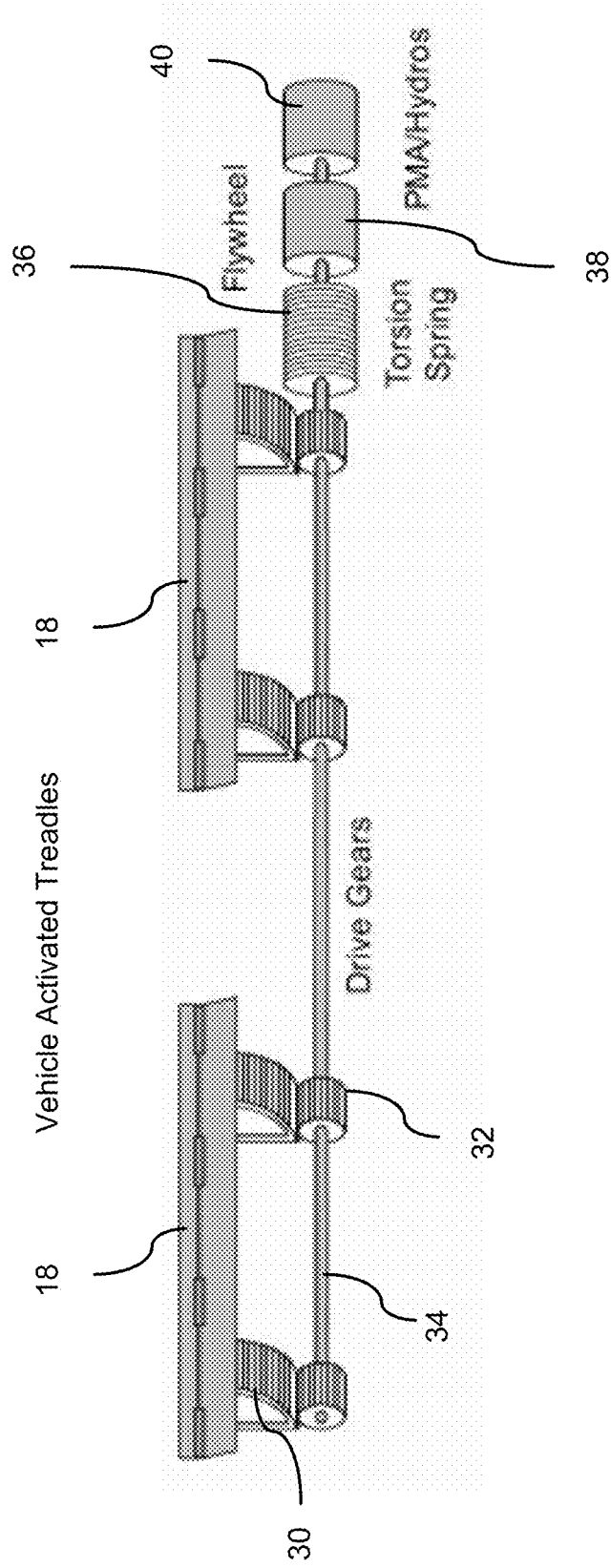
FIG. 2 is a schematic perspective view illustrating a portion of a vehicle energy harvester.
Figure 3:
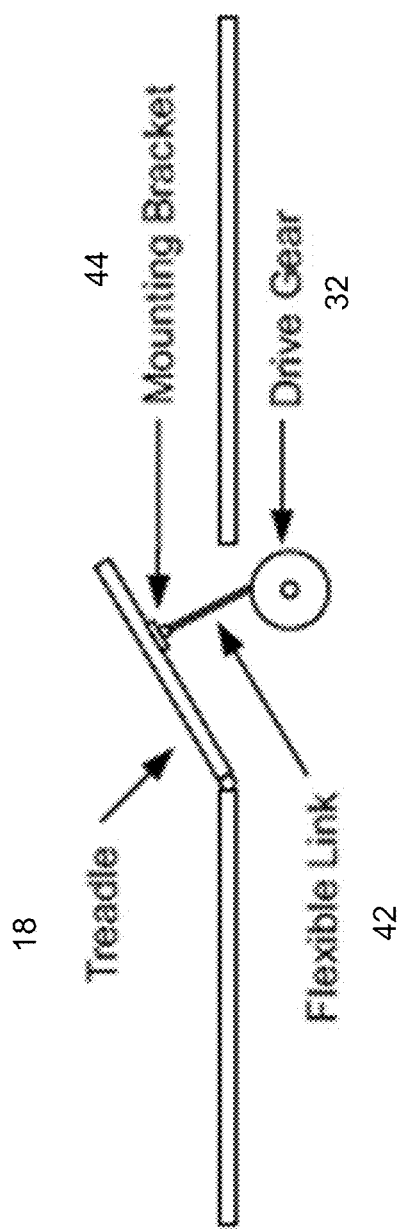
FIG. 3 is a schematic side view illustrating a portion of a vehicle energy harvester.

Referring now to the drawings, FIGS. 1-3 illustrate an exemplary vehicle energy harvester.

The exemplary embodiments can make productive use of the energy that is normally wasted (in the form of heat) in reducing the speed of motor vehicles on exit ramps, toll plazas etc., etc. The vehicle energy harvester can absorb mechanical energy from passing (or breaking) vehicles and convert the mechanical energy to electrical energy using, for example, shaft driven generators. Other means for converting the mechanical energy to electrical energy also are contemplated. In an exemplary aspect, the electric power from the generators can be converted, metered, and fed into the commercial power grid. In another exemplary aspect, each site can be equipped with wireless communications to monitor the status and/or output of the system.

Power Absorber Configuration

The disclosed embodiments can include individual assemblies with integral generators. Other generator configurations also are possible, such as separate generators.

As shown in FIG. 1, the vehicle energy harvester unit 10 can be a low-profile surface mounted assembly. The vehicle energy harvester unit 10 can include an entry ramp 12 and an exit ramp 14. The vehicle energy harvester unit 10 can include a plurality of subunits 16. Each subunit can include one or more vehicle activated treadles 18. In an embodiment, each subunit 16 can include a generator unit 20.

In other embodiments, the vehicle energy harvester unit 10 can be set into the road surface. The surface mounted assembly may require minimal installation effort. Additionally, the unit count can be scaled to road/breaking needs. In an embodiment, each generator unit 20 can feed a common power summing/conversion unit 22. A simple cable interconnect 24 can be provided to connect each generator unit 20 to the common power summing/conversion unit 22. A fail safe configuration can protect the system against individual unit failures.

Power Conversion Unit

In a disclosed embodiment, the individual absorber subunits 16 can be connected via cable assemblies 24. The input power can be summed and applied to a low-loss inverter unit. The power can be converted immediately to a form that is transmittable to the power grid. The output can be metered and applied to the power grid for transmission.

Absorber Unit Operation

With reference to FIG. 2, an exemplary embodiment of a subunit 16 of a vehicle energy harvester unit 10 can include spring-loaded treadles 18 having a treadles gear 30 engaging a drive gear 32. The drive gear 32 is coupled to a shaft 34. In operation, one or more vehicle tires force the spring-loaded treadles 18 down as they roll over the treadles 18. The treadle gears 30 drive the plurality of drive gears 32, which rotate the shaft 34. The shaft 34 winds a torsion spring 36, thereby absorbing the treadle drive transient. A pawl can lock the shaft 34 as rotation ends. The torsion spring 36 rotates a flywheel 38, thereby spreading the impulse of the treadle drive over time to extend output to a generator 40. The flywheel 38 can turn a generator 40, such as a hydro pump. The generator 40, in turn, can generate electric power for sale/use/storage.

Transient Absorption Means

With reference to FIGS. 2 and 3, in order to reduce the wear and tear on the treadle assembly, an exemplary embodiment of a subunit 16 of a vehicle energy harvester unit 10 can include a transient absorption means in the form of a torsion spring, as illustrated in FIGS. 2 and 3. In conventional systems, the treadle drive mechanism commonly is attached directly to an electrical generation means. As a result, high speed vehicle impacts with the treadle assembly will cause undue stress on the mechanical components due to the inertia of the electrical generation means connected to it. The exemplary embodiments of the present invention, for example as shown in FIGS. 2 and 3, reduce the mechanical stress (impulse) on the mechanical components substantially by storing the treadle drive output in the torsion spring 36 which will release its stored energy to the alternator/generator 40 after the vehicle passes over the treadle 18.

More particularly, the torsion spring 36 can provide advantages of absorbing the impulse imparted by fast-moving vehicles striking the treadles 18. The torsion spring 36 also can isolate the treadle assembly from mass/inertia of the connected flywheel 38 and alternator/generator 40. The torsion spring 36 further can release stored energy to the electrical charging means with very little loss.

As shown in FIG. 3, in another embodiment, a flexible link 42 can provide a low-cost alternative. In this embodiment, the vehicle striking the treadle 18 forces the treadle 18 to rotate about its hinged end point. The inertia of the charging system resists turning of the drive gear 32. The flexible link 42 will bow (or bend, flex, etc.) to absorb the impulse, and then release the energy to the charging system (e.g., alternator/generator 40).

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A vehicle energy harvester comprising:
a subunit having an upper surface forming a roadway surface;
a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface;
a generator that generates power in response to movement of the vehicle activated treadle;
a drive gear mounted on a rotatable shaft, wherein the drive gear being driven by movement of the vehicle activated treadle, and the rotatable shaft is coupled to the generator; and
a transient absorption device coupled between the drive gear and the generator.

2. The vehicle energy harvester of claim 1, wherein the transient absorption device is a torsion spring.

3. The vehicle energy harvester of claim 2, comprising:
a flywheel coupled between the torsion spring and the generator.

4. The vehicle energy harvester of claim 1, wherein the transient absorption device is a flexible link.

5. The vehicle energy harvester of claim 1, comprising:
a treadle gear coupled to the vehicle activated treadle, the drive gear engaging and being driven by movement of the treadle gear.

6. The vehicle energy harvester of claim 5, comprising:
a flywheel coupled between the transient absorption device and the generator.

7. The vehicle energy harvester of claim 1, comprising:
a treadle gear coupled to the vehicle activated treadle, the drive gear engaging and being driven by movement of the treadle gear.

8. The vehicle energy harvester of claim 7, comprising:
a flywheel coupled between the transient absorption device and the generator.

9. A vehicle energy harvester comprising:
a subunit having an upper surface forming a roadway surface;
a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface;
a generator that generates power in response to movement of the vehicle activated treadle; and
a drive gear mounted on a rotatable shaft, wherein the rotatable shaft is coupled to the generator,
wherein the drive gear is driven by movement of the vehicle activated treadle, and
wherein a transient absorption device couples the vehicle activated treadle to the drive gear.

10. The vehicle energy harvester of claim 9, wherein the transient absorption device is a flexible link coupled between the vehicle activated treadle and the drive gear.

11. A vehicle energy harvester comprising:
a plurality of subunits each having an upper surface forming a roadway surface;
a vehicle activated treadle on at least one of the plurality of subunits, the vehicle activated treadle moveable between a first position in which an upper surface of the treadle is at an angle with respect to the upper surface of the roadway surface and a second position in which the upper surface of the treadle is flush with the upper surface of the roadway surface;
a generator that generates power in response to movement of the vehicle activated treadle;
a drive gear mounted on a rotatable shaft, wherein the drive gear being driven by movement of the vehicle activated treadle, and the rotatable shaft is coupled to the generator; and
a transient absorption device coupled between the drive gear and the generator.

12. The vehicle energy harvester of claim 11, wherein the transient absorption device is a torsion spring.

13. The vehicle energy harvester of claim 12, comprising:
a flywheel coupled between the torsion spring and the generator.

14. The vehicle energy harvester of claim 11, wherein the transient absorption device is a flexible link.

15. The vehicle energy harvester of claim 11, comprising:
an entry ramp at a first end of the harvester roadway surface; and
an exit ramp at a second end of the harvester roadway surface, wherein the plurality of subunits form a low-profile surface mounted assembly configured to be surface mounted on a vehicle roadway.

16. A vehicle energy harvester, comprising:
a plurality of subunits having an upper surface forming a roadway surface;
a vehicle activated treadle on at least one of the plurality of subunits, the vehicle activated treadle moveable between a first position in which an upper surface of the treadle is at an angle with respect to the upper surface of the roadway surface and a second position in which the upper surface of the treadle is flush with the upper surface of the roadway surface;
a generator that generates power in response to movement of the vehicle activated treadle; and
a drive gear mounted on a rotatable shaft, wherein the rotatable shaft is coupled to the generator,
wherein the drive gear is driven by movement of the vehicle activated treadle, and
wherein a transient absorption device couples the vehicle activated treadle to the drive gear.

17. The vehicle energy harvester of claim 16, wherein the transient absorption device is a flexible link coupled between the vehicle activated treadle and the drive gear.

* * * * *